(12) United States Patent
Sung (10) Patent No.: US 6,904,425 B2
(45) Date of Patent: Jun. 7, 2005

(54) METHOD AND SYSTEM FOR INQUIRING PRODUCT EXPORTATION

(75) Inventor: Min-Tzu Sung, Taipei (TW)

(73) Assignee: Inventec Corporation, Taipei (TW)

( * ) Notice: Subject to any disclaimer, the term of this patent is extended or adjusted under 35 U.S.C. 154(b) by 468 days.

(21) Appl. No.: 09/994,633

(22) Filed: Nov. 28, 2001

(65) Prior Publication Data

US 2003/0101157 A1 May 29, 2003

(51) Int. Cl.$^7$ .............................................. G06F 17/30
(52) U.S. Cl. .................... 707/1; 707/5; 707/10; 707/104.1; 709/220; 709/227; 705/8; 705/23; 705/26
(58) Field of Search .................. 707/1, 5, 10, 101, 707/102, 103 R, 104.1, 201, 204; 709/219, 229; 705/8, 23, 26, 27

(56) References Cited

U.S. PATENT DOCUMENTS

| | | | | |
|---|---|---|---|---|
| 5,406,475 A | * | 4/1995 | Kouchi et al. ................ 705/8 |
| 5,519,878 A | * | 5/1996 | Dolin, Jr. .................... 709/220 |
| 5,712,985 A | * | 1/1998 | Lee et al. ...................... 705/7 |
| 5,841,978 A | * | 11/1998 | Rhoads ....................... 709/217 |
| 5,913,210 A | * | 6/1999 | Call ............................. 707/4 |
| 5,940,595 A | * | 8/1999 | Reber et al. ................ 709/227 |
| 6,134,532 A | * | 10/2000 | Lazarus et al. .............. 705/14 |
| 6,199,048 B1 | * | 3/2001 | Hudetz et al. ............... 705/23 |
| 6,542,933 B1 | * | 4/2003 | Durst et al. ................ 709/229 |
| 6,714,947 B2 | * | 3/2004 | Fa ........................... 707/104.1 |
| 2002/0055883 A1 | * | 5/2002 | Shiba et al. ................. 705/26 |
| 2002/0120537 A1 | * | 8/2002 | Morea et al. ................ 705/35 |
| 2002/0133435 A1 | * | 9/2002 | Ito et al. ..................... 705/28 |
| 2002/0184102 A1 | * | 12/2002 | Markopoulos et al. ........ 705/26 |
| 2003/0046180 A1 | * | 3/2003 | Chiu et al. .................. 705/26 |

* cited by examiner

*Primary Examiner*—Charles Rones
*Assistant Examiner*—Jacques Veillard
(74) *Attorney, Agent, or Firm*—Rothwell, Figg, Ernst & Manbeck (57) ABSTRACT

A method and system for inquiring product exportation are proposed, for allowing a user at a terminal device to inquire associated data relating to product exportation on a browser of the terminal device via a network communication system, wherein the system for inquiring product exportation includes an exporting station, a database and a database server. In the use of the method and system for inquiring product exportation, if a manufacturer receives a request of assembly replacement from a client, the manufacturer can inquire an exporting file stored in a database for obtaining exportation data of products delivered to the client. Therefore, the manufacturer can monitor true reasons for the assembly replacement, so as to avoid expense in non-necessary costs and increase profit.

15 Claims, 7 Drawing Sheets

| Login User : | 8915019 | | |
|---|---|---|---|
| Input Customer SNo or Mb SNo | 1J14FM736323 | | Go |

Customer SNo 1J14FM736323    Mb SNo BN13M10JE1

| Parts | Description | Vendor | Version |
|---|---|---|---|
| 1B1203 | FDD-COM | CITIZEN | |
| 2B4101 | HDD-12GB | IBM | |
| 6B120D | BATT-COM | SONY | |
| BBK101 | KB-BR | JME | |
| LMB38 | LM | SANYO | V1.11 |
| PB2104 | MDM-COMBO | AMBIT | |

FIG. 5

| Login User : | 8915019 | | | |
|---|---|---|---|---|
| Input Customer SNo or Mb SNo | 1J15JFC37 | | 40' | Go |

| CustNo. | Parts | Description | Vendor | Version |
|---|---|---|---|---|
| 1J15JFC37001 | 1N1200J1KT1V1 | FDD | MTS | |
| 1J15JFC37001 | 2N7302J1KS2AG | HDD-20GB | TSB | |
| 1J15JFC37002 | 1N1200J1KT1VF | FDD | MTS | |
| 1J15JFC37002 | 2N7302J1KS1HO | HDD-20GB | TSB | |
| 1J15JFC37002 | 6N1204J1KT1BC | BATT | SONY | |
| 1J15JFC37003 | 2N7302J1KS28M | HDD-20GB | TSB | |
| 1J15JFC37003 | 6N1204J1KT1BJ | BATT | SONY | |

FIG. 6

METHOD AND SYSTEM FOR INQUIRING PRODUCT EXPORTATION

FIELD OF THE INVENTION

The present invention relates to methods and systems for inquiring product exportation, and more particularly, to a method and system for inquiring product exportation, in which a user at a terminal device can inquire associated data relating to product exportation on a browser of the terminal device via a network.

BACKGROUND OF INVENTION

In accordance with requests various in product assemblies as desired by clients, the product assemblies are manufactured and assembled into products for exportation corresponding to the requests of the clients.

However, after the products are delivered to the clients, in some cases, the clients complain that the products are assembled with wrong assemblies therein, e.g. wrong capacity or brand of hard disk in a computer, and thus ask for replacing the wrong assemblies immediately. Since no inquiry system with integrated data of clients and product exportation is available, thus a manufacturer who exports the products can not realize in real time true reasons for assembly replacement, e.g. errors occurring in product assemblage by the manufacturer, or fake assembly replacement asked by the clients who illegally change the product assemblies. In this case, the manufacturer usually pays for the assembly replacement itself, and again produces and assembles the assemblies into products for being exported to the clients. This therefore significantly reduces profit, but increases the manufacture cost.

Therefore, how to provide product exportation information for inquiry in real time is a critical problem to solve, for allowing an enterprise to truly monitor the exportation information, so as to achieve profit increase and cost reduction.

SUMMARY OF THE INVENTION

A primary objective of the present invention is to provide a novel method and system for inquiring product exportation, in which data relating to exported products can be inquired in real time, and a manufacturer can immediately monitor the exportation data after the products are delivered to a client, so as to increase profit and reduce costs.

In accordance with the foregoing and other objectives, the present invention proposes a method and system for inquiring product exportation, for allowing a user at a terminal device to inquire associated data relating to product exportation on a browser of the terminal device via a network communication system. The system for inquiring product exportation comprises: an exporting station, a database and a database server.

The exporting station establishes an exporting file corresponding to each product exportation, wherein a client sequence number and a product category sequence number of the product exportation are used as an identification code (ID) for the exporting file. The database is used for storing the exporting file established by the exporting station. The database server receives an identification code inputted by the user at the terminal device, wherein the identification code includes a client sequence number and a product category sequence number, so as to read an exporting file in the database having a client sequence number and a product category sequence number corresponding to the received client sequence number and product category sequence number, and transmit the read exporting file to the user at the terminal device, for allowing the user to examine assembly data of exported products. Moreover, the database server includes a processing module for establishing a quotation and an exportation data report corresponding to the read exporting file, and the database server transmits the quotation and the exportation data report via the network communication system to the browser of the terminal device, so as to transmit the quotation and the exportation data report to a client who orders the exported products, for allowing the client to examine and pay for the exported products.

In the method for inquiring product exportation with the use of the system for inquiring product exportation of the invention, first, upon receiving a client sequence number or a product category sequence number inputted by a user at the terminal device, the system for inquiring product exportation reads an exporting file having a client sequence number or a product category sequence number in the database corresponding to the client sequence number or the product category sequence number inputted by the user; next, the system for inquiring product exportation establishes a quotation and an exportation data report corresponding to the read exporting file; then, the quotation and the exportation data report are transmitted via the network communication system to a client who orders exported products; and finally, the client examines and pay for the exported products according to the exportation data report and the quotation, respectively.

In the use of the method and system for inquiring product exportation of the invention, if a manufacturer receives a request of assembly replacement from a client, the manufacturer can inquire an exporting file stored in a database for obtaining exportation data of products delivered to the client. Therefore, the manufacturer can monitor true reasons for the assembly replacement, so as to avoid expense in non-necessary costs and increase profit.

BRIEF DESCRIPTION OF THE DRAWINGS

The present invention can be more fully understood by reading the following detailed description of the preferred embodiments, with reference made to the accompanying drawings wherein:

FIG. 4 is a schematic diagram showing a practical embodiment of a displayed picture for allowing a user to inquire product exportation in the use of a method and system for inquiring product exportation of the invention;

DETAILED DESCRIPTION OF THE PREFERRED EMBODIMENT

Figure 1:
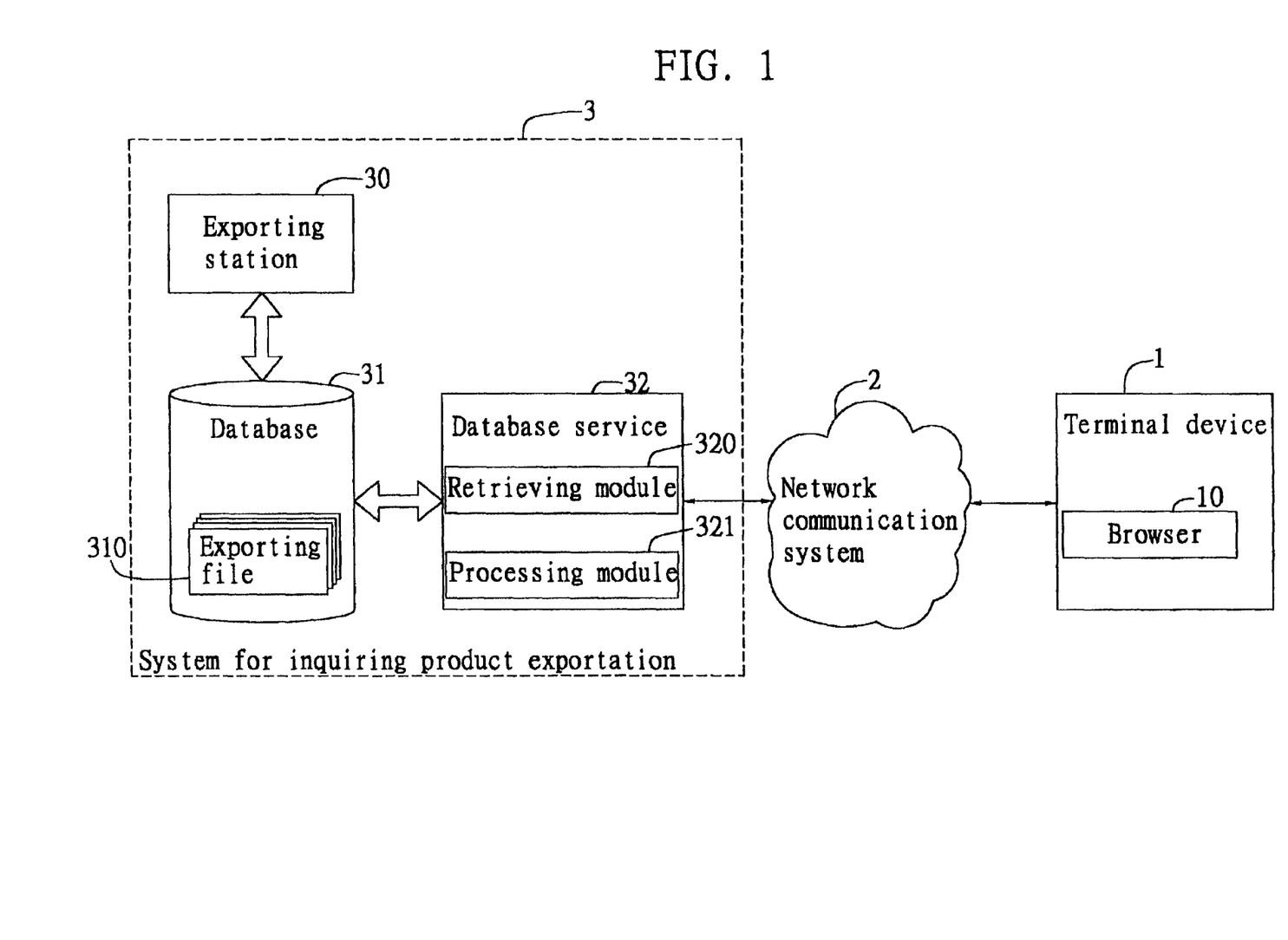
FIG. 1 is a schematic block diagram showing basic architecture of a system for inquiring product exportation of the invention.

Referring to FIG. 1, it illustrates basic architecture of a system for inquiring product exportation of the invention. As shown in the drawing, the system for inquiring product exportation 3 allows a user at a terminal device 1 to inquire associated data relating to product exportation on a browser 10 of the terminal device 1 via a network communication system 2. The system for inquiring product exportation 3 can be e.g. a large-scale commercial computer system. The network communication system 2 can be e.g. internet or intranet, which interconnects the terminal device 1 and the system for inquiring product exportation 3, for allowing the system for inquiring product exportation 3 to transmit data to the terminal device 1. Internal system architecture of the system for inquiring product exportation 3 includes an exporting station 30, a database 31 and a database server 32.

The exporting station 30 is used to establish an exporting file 310 for each exported product, wherein a client sequence number or a product category sequence number of the exported product is used as an identification code (ID) for the exporting file 310, whereas the export file 310 is stored in the database 31.

The database server 32 allows the user at the terminal device 1 to read the exporting file 310 stored in the database 31. Upon receiving a request for inquiring product exportation data submitted by the user at the terminal device 1, the database server 32 reads an exporting file 310 in the database 31 corresponding to the inquiry request, and transmits the read exporting file 310 to the terminal device 1.

The database server 32 includes a retrieving module 320 and a processing module 321. The retrieving module 320 is used to receive a client sequence number or a product category sequence number transmitted from the user at the terminal device 1, and read an exporting file 310 in the database 31 corresponding to the transmitted client sequence number or product category sequence number. For example, if a client sequence number or a product category sequence number consists of 12 numerals, the user can input the first 6 (or 8) numerals, and the database server 32 compares the inputted 6 (or 8) numerals with IDs of exporting files 310 in the database 31, for determining if any exporting file 310 has an ID identical in a first few numerals to the 6 (or 8) numerals inputted by the user. Therefore, the database server 32 allows the user to perform obscure inquiry, which provides more flexibility in inquiry inputting for the user. Next, the read exporting file 310 is transmitted to the processing module 321, and the exporting file 310 is processed to be a table form, which is transmitted to the browser 10 of the terminal device 1 via the network communication system 2, so as to allow the user to easily read exportation data of the exporting file 310, and to transmit the table form of the exportation data via the network communication system 2 or a general fax device to a client who ask for product assembly displacement. This allows the client to make sure of correctness of delivered products, and makes the table form of the exportation data used as basis for charging the client if necessary.

Figure 2:
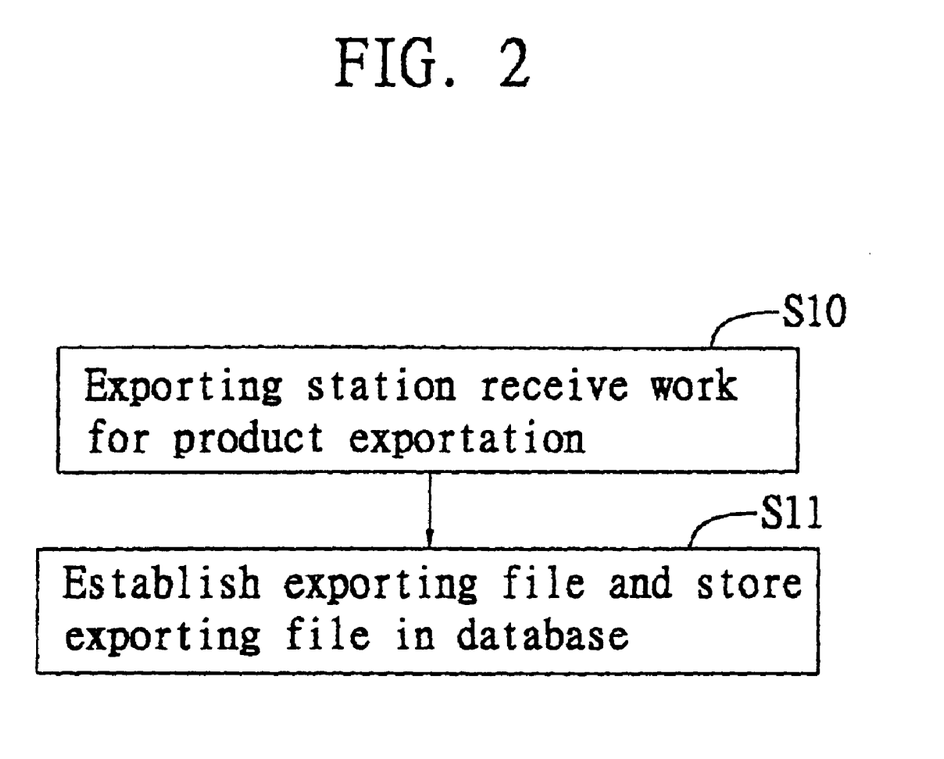
FIG. 2 is a schematic diagram showing the steps involved in establishing a database for allowing a user to inquire product exportation therein.

Referring to FIG. 2, it illustrates the steps involved in establishing a database for allowing a user to inquire product exportation therein. As shown in the drawing, in step S10, upon receiving work for exporting a product, an exporting station 30 performs step S11, wherein the exporting station 30 establishes an exporting file 310 for the exported product, and a client sequence number or a product category sequence number of the exported product is used as an identification code (ID) of the exporting file 310, whereas the export file 310 is stored in a database 31.

Therefore, after the database 31 is established by the exporting station 30, a user at a terminal device 1 is allowed to immediately inquire associated data relating to product exportation on a browser 10 via a network communication system 2.

Figure 3A:
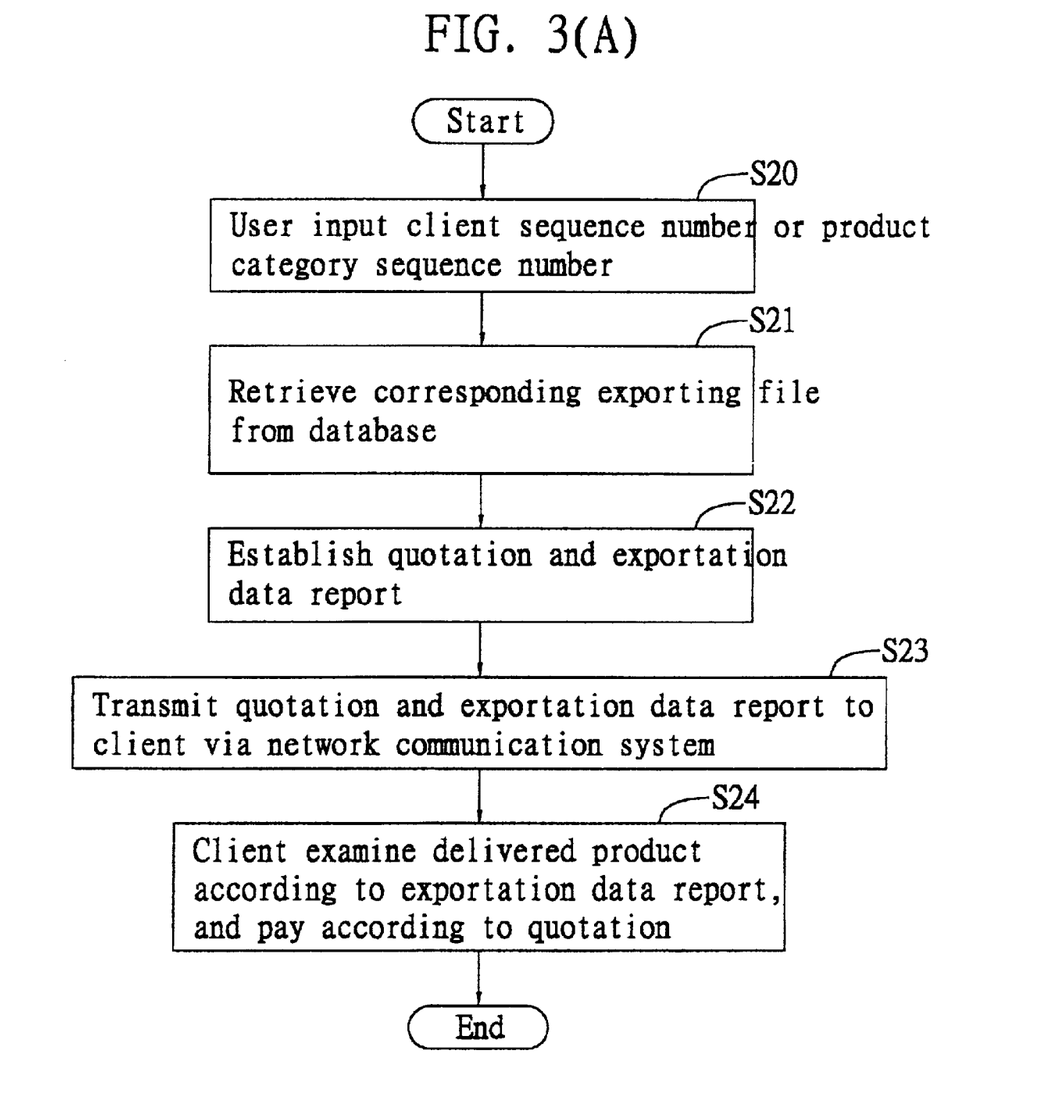
FIGS. 3(A) and 3(B) are schematic diagrams showing the steps for depicting a method for inquiring product exportation in the use of a system for inquiring product exportation of the invention.
Figure 3B:
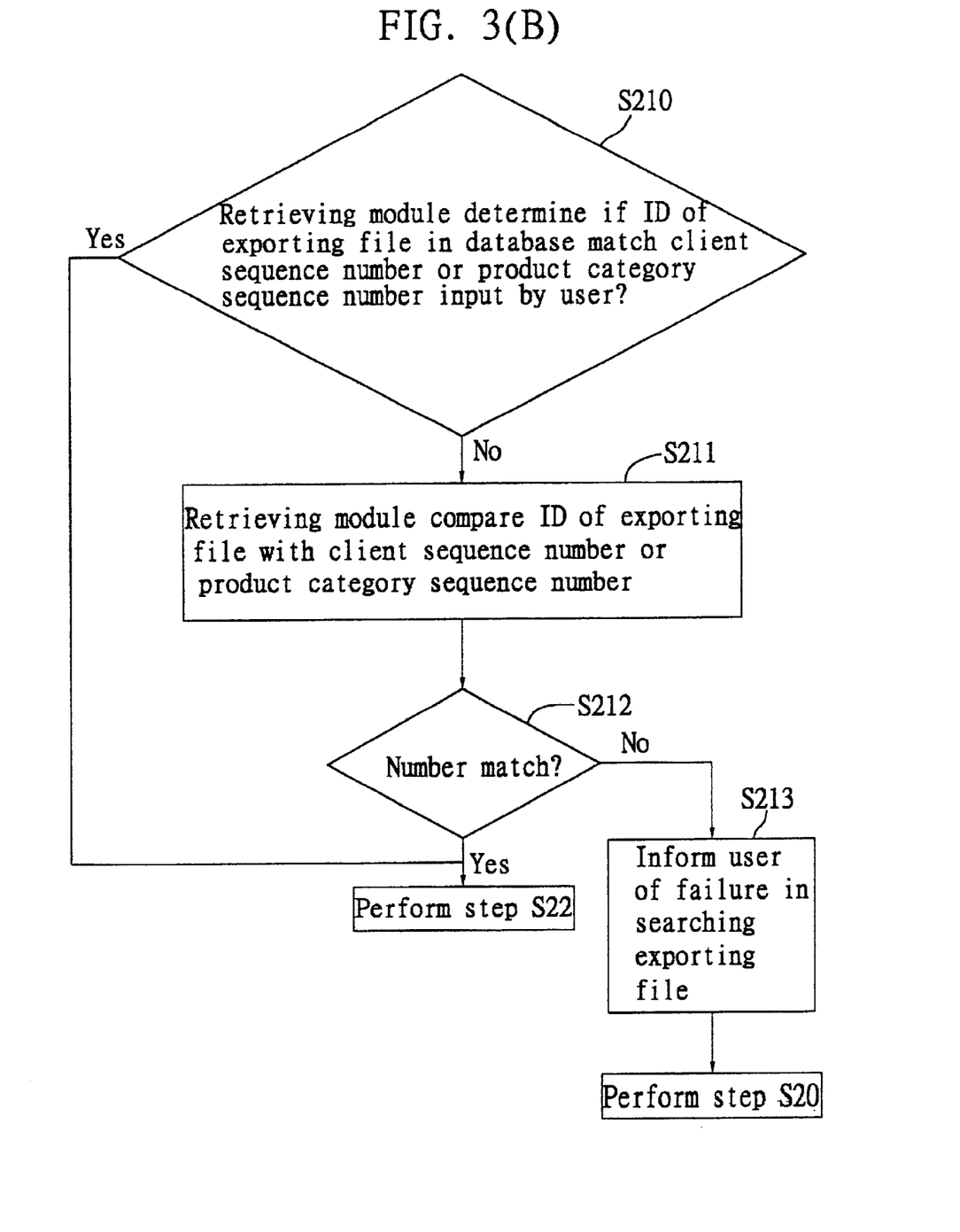

Referring to FIGS. 3(A) and 3(B), they illustrate the steps for depicting a method for inquiring product exportation in the use of a system for inquiring product exportation of the invention. The following description is made with reference to FIGS. 1, 3(A) and 3(B).

Prior to performing the steps depicted in FIGS. 3(A) and 3(B), a user at the terminal device 1 needs to utilize the browser 10 of the terminal device 1, and submits a request for on-line registering and loginning to the system for inquiring product exportation 3 via the network communication system 2. That is, after a login account and a password inputted by the user are identified, the user can login the system for inquiring product exportation 3. Since the identifying process is a conventional process necessarily performed prior to system loginning, it is not further described in detail, but only depicted as related to the invention in the following. As shown in FIG. 3(A), first in step S20, the user at the terminal device 1 inputs a client sequence number or a product category sequence number to the browser 10 of the terminal device 1 via the network communication system 2. Thereafter, step S21 is followed.

In step S21, upon receiving the client sequence number or product category sequence number inputted by the user at the terminal device 1, the database server 32 reads an exporting file 310 in the database 31 corresponding to the client sequence number or product category sequence number. Thereafter, step S22 is followed.

In step S22, the database server 32 transmits the read exporting file 310 to the processing module 321, for allowing the processing module 321 to establish a quotation (not shown) and an exportation data report (not shown) according to the exporting file 310. Thereafter, step S23 is followed.

In step S23, the database server 32 transmits the established quotation and exportation data report to the browser 10 of the terminal device 1 via the network communication system 2, so as to allow the user to realize product exportation condition, and transmit the quotation and exportation data report via the network communication system 2 or a fax device to a client who orders products. Thereafter, step S24 is followed.

In step S24, upon receiving the quotation and exportation data report, the client can examine correctness of delivered products according to the quotation and exportation data report, and subsequently pay for the products according to the quotation.

Next, referring to FIG. 3(B), it illustrates in detail the steps involved in performing step 21 of FIG. 3(A). First in step S210, the retrieving module 320 determines if an exporting file 310 in the database 31 has its ID matching the client sequence number or product category sequence number inputted by the user. If such a matching exporting file 310 is available, then the step S22 of FIG. 3(A) is returned; or else, step S211 is followed.

In step S211, the retrieving module 320 compares the client sequence number or product category sequence number inputted by the user with IDs of exporting files 310 in the database 31. Thereafter, step S212 is followed.

In step S212, the retrieving module 320 determines if any exporting file 310 in the database 31 has an ID matching the number inputted by the user in a first few numerals. If such a matching exporting file 310 is available, then the step S22 of FIG. 3(A) is returned; or else, step S213 is followed.

In step S213, the database server 32 sends a message of failure in searching a matching exporting file 310, and then the step S20 of FIG. 3(A) is returned, so as to allow the user to re-input a client sequence number or product category sequence number for inquiry.

Further in the step S212, if the matching exporting file 310 is available, that is, the first few numerals (e.g. the first 8 or 9 numerals) of the ID of the exporting file 310 in the database 31 match those of the number inputted by the user, the processing module 321 establishes a quotation or an exportation data report according to the exporting file 310. Therefore, the method and system for inquiring product exportation of the invention allow the user to perform obscure inquiry for searching desired exportation data.

In conclusion, in the use of the method and system for inquiring product exportation of the invention, if a manufacturer receives a request for replacing product assemblies from a client, the manufacturer can inquire associated data relating to product exportation stored in a database via internet or intranet. Therefore, the manufacturer is able to monitor actual exportation data and realize true reasons for the assembly replacement, so as to avoid expense in non-necessary costs and increase profit.

Referring to FIG. 4, it illustrates a practical embodiment of a displayed picture 4 for allowing a user to inquire product exportation in the use of a method and system for inquiring product exportation of the invention. As shown in the drawing, the picture 4 is transmitted by the system for inquiring product exportation 3 via a network communication system 2 to a browser 10 of a terminal device 1, so as to allow a user at the terminal device 1 to input data for inquiry. The system for inquiring product exportation 3 reads an exporting file 310 in a database 31 matching the inputted data, which include a client sequence number or a product category sequence number.

First, the user inputs the client sequence number or product category sequence number for inquiry to an input field 40 and selects a "go" button 41 for initiating the inquiry. A database server 32 receives the client sequence number or product category sequence number transmitted from the terminal device 1, and retrieves an exporting file 310 from the database 31 corresponding to the inquiry. The retrieved exporting file 310 is displayed on the picture 4 of the browser 10 of the terminal device 1 in the form of a client sequence number field 42, a product category sequence number field 43 and an exportation data report 44.

Therefore, if a client asks for assembly replacement, the user at the terminal device 1 can monitor the exportation data report 44 displayed on the browser 10 of the terminal device 1. If product assemblies listed in the exportation data report 44 are not completely identical to those requested by the client, it can determine that an error in product assemblage is made by an exporting station 30 during product exportation, and thus the assembly replacement can be performed for replacing the wrong product assemblies with correct assemblies for the client. This therefore avoids the occurrence of fake assembly replacement requested by the client, and effectively decrease expense in non-necessary costs for a manufacturer.

Figure 5:
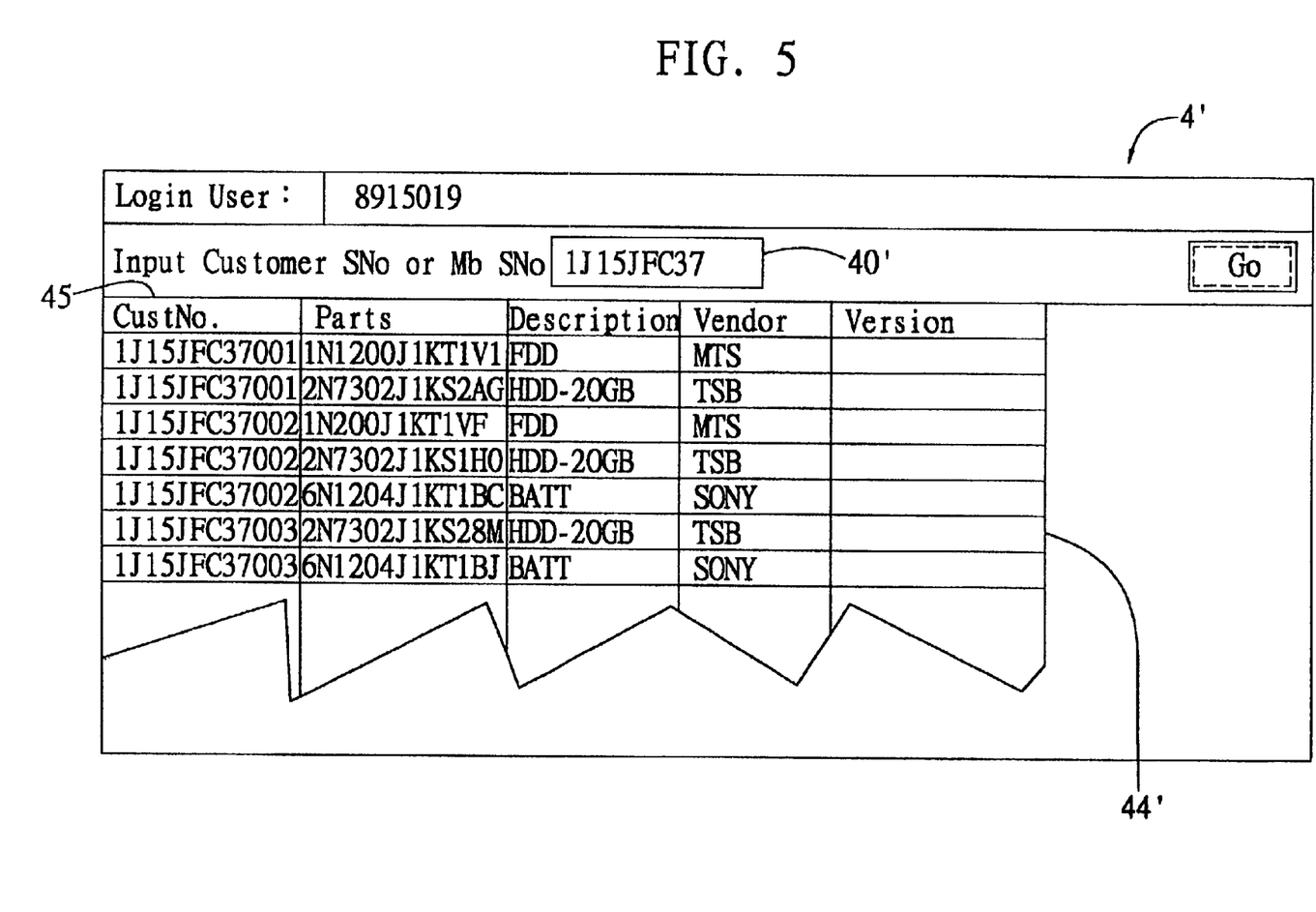
FIG. 5 is a schematic diagram showing another practical embodiment of a displayed picture for allowing a user to inquire product exportation in the use of a method and system for inquiring product exportation of the invention.

Referring to FIG. 5, it illustrates another practical embodiment of a displayed picture 4' for allowing a user to inquire product exportation in the use of a method and system for inquiring product exportation of the invention. As shown in the drawing, the picture 4' is identical in operation and displayed content to the foregoing picture 4, with the only difference in data inputted to an input field 40' on the picture 4'. In this embodiment, a client sequence number consists of 12 numerals. If a user merely inputs the first 9 numerals of the client sequence number to the input field 40' (e.g. 1J15JFC37), a retrieving module 320 determines if an exporting file 310 in a database 31 has an identification code (ID) with a first few numerals matching the inputted 9 numerals, and processes the matching exporting file 310 to be an exportation data report 44', which is displayed on a browser 10 of a terminal device 1, and has a client sequence number filed 45 showing a complete client sequence number therein (i.e. 12 numerals).

Figure 6:
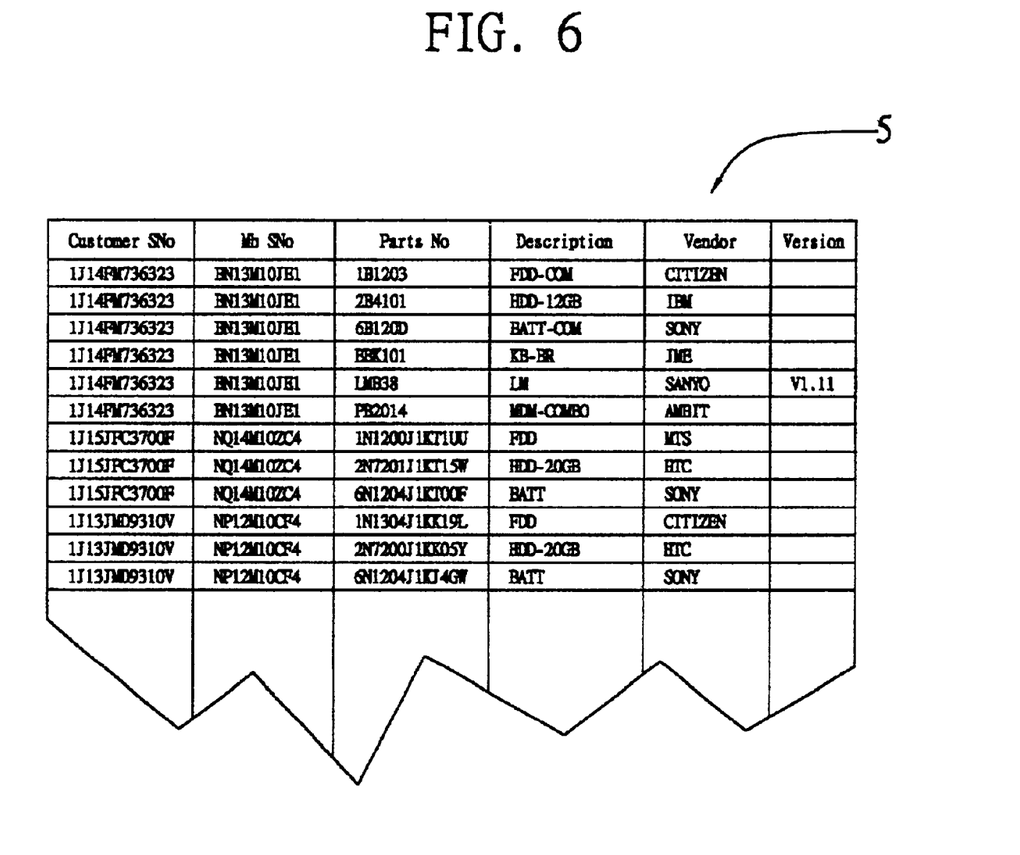
FIG. 6 is a schematic diagram showing a further practical embodiment of a quotation of product assemblies provided for a client in the use of a method and system for inquiring product exportation of the invention.

Referring to FIG. 6, it illustrates a further practical embodiment of a quotation 5 of product assemblies provided for a client in the use of a method and system for inquiring product exportation of the invention. As shown in the drawing, first, after performing the inquiry for exportation data as shown in FIG. 4 or 5, if a client asks or assembly replacement, a manufacturer can monitor an exportation report 44 and determine of product assemblies listed in the exportation report 44 are identical to those requested by the client. If the product assemblies match those requested by the client, the manufacturer can then make sure no error in product assemblage occurring during product exportation, and thus transmit the quotation 5 of product assemblies to the client, so as to charge the client for the assembly replacement according to the quotation 5. The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A system for inquiring product exportation, for allowing a user at a terminal device to inquire associated data relating to product exportation on a browser of the terminal device via a network communication system;

the system comprising:

an exporting station for establishing an exporting file corresponding to each product exportation, and providing a dedicated identification code for the exporting file;

a database for storing the exporting file established by the exporting station; and a database server for receiving an identification code inputted by the user at the terminal device, and for reading an exporting file in the database having an identification code corresponding to the received identification code, wherein a quotation and an exportation data report are established by the database server corresponding to the read exporting file, and transmitted to the browser at the terminal device, so as to allow the user to examine exported products and transmit the quotation and the exportation data report to a client who orders the exported products, for allowing the client to examine and pay for the exported products.

2. The system of claim 1, wherein if the database server determines that no exporting file in the database has an identification code exactly matching the identification code inputted by the user, the database server compares the identification code inputted by the user with identification codes of exporting files in the database, and determines if an exporting file in the database has an identification code similarly matching in a few first numerals the identification code inputted by the user;

if the similarly matching exporting file is available, a quotation and an exportation data report are established for the exporting file.

3. The system of claim 1, wherein the identification code is a client sequence number or a product category sequence number.

4. A system for inquiring product exportation, for allowing a user at a terminal device to inquire associated data relating to product exportation on a browser of the terminal device via a network communication system;

the system comprising:

an exporting station for establishing an exporting file corresponding to each product exportation, and providing a client sequence number or a product category sequence number for the exporting file;

a database for storing the exporting file established by the exporting station; and a database server for receiving a client sequence number or a product category sequence number inputted by the user at the terminal device, and for reading an exporting file in the database having a client sequence number or a product category sequence number corresponding to the received client sequence number or product category sequence number;

if the database server determines that no exporting file in the database has a client sequence number or a product category sequence number exactly matching the client sequence number or the product category sequence number inputted by the user, the database server compares the client sequence number or the product category sequence number inputted by the user with client sequence numbers or the product category sequence numbers of exporting files in the database, and determines if an exporting file in the database has a client sequence number or a product category sequence number similarly matching in a few first numerals the client sequence number or the product category sequence number inputted by the user;

if the similarly matching exporting file is available, a quotation and an exportation data report are established for the exporting file, and transmitted to the browser at the terminal device, so as to allow the user to examine exported products and transmit the quotation and the exportation data report to a client who orders the exported products, for allowing the client to examine and pay for the exported products.

5. A system for inquiring product exportation, for allowing a user at a terminal device to inquire associated data relating to product exportation on a browser of the terminal device via a network communication system;

the system comprising:

an exporting station for establishing an exporting file corresponding to each product exportation, and providing a dedicated identification code for the exporting file;

a database for storing the exporting file established by the exporting station; and a database server for receiving an identification code inputted by the user at the terminal device, and for reading an exporting file in the database having an identification code corresponding to the received identification code, so as to transmit the read exporting file to the user at the terminal device, wherein the database server further includes a retrieving module;

if the database server determines that no exporting file in the database has an identification code exactly matching the identification code inputted by the user, the retrieving module compares the identification code inputted by the user with identification codes of exporting files in the database, and determines if an exporting file in the database has an identification code similarly matching in a few first numerals the identification code inputted by the user;

if the similarly matching exporting file is available, the exporting file is transmitted to the user at the terminal device.

6. The system of claim 5, wherein the database server further includes a processing module for establishing a quotation and an exportation data report corresponding to the read exporting file, and the database server transmits the quotation and the exportation data report via the network communication system to the browser of the terminal device, so as to allow the user to examine exported products, and transmit the quotation and the exportation data report to a client who orders the exported products, for allowing the client to examine and pay for the exported products.

7. The system of claim 5, wherein the identification code is a client sequence number or a product category sequence number.

8. A method for inquiring product exportation, for use with a system for inquiring product exportation, for allowing a user at a terminal device to inquire associated data relating to product exportation on a browser of the terminal device via a network communication system, wherein an exporting station of the system for inquiring product exportation pre-establishes an exporting file corresponding to each product exportation, and stored the established exporting file in a database;

the method comprising the steps of:

(1) inputting a dedicated identification code of an exporting file for inquiry via the user at the terminal device through the browser of the terminal device and the network communication system;

(2) after receiving the identification code transmitted from the terminal device via the system for inquiring product exportation, determining via the retrieving module if an exporting file has an identification code in the database exactly matching the identification code inputted by the user, wherein if the exactly matching exporting file is available, then the step (5) is followed:

or else, step (3) is followed:

(3) comparing via the retrieving module the identification code inputted by the user with identification codes of exporting files in the database, and determining if an exporting file in the database has an identification code similarly matching the identification code inputted by the user, wherein if the similarly matching exporting file is available, then the step (3) is followed:

or else, step (2-3) is followed; and (4) informing the user at the terminal device of failure in searching an exactly matching or similarly matching exporting file via the system for inquiring product exportation; and (5) transmitting the available exporting file to the user at the terminal device via the system for inquiring product exportation.

9. The method of claim 8, wherein in the step (2—2), the identification code inputted by the user is compared in a first few numerals with the identification codes of the exporting files in the database.

10. The method of claim 8, wherein the system for inquiring product exportation further comprises a processing module for processing the read exporting file in the step (2) to be a report form, and the step (3) further comprises the steps of:

(3-1) establishing a quotation and an exportation data report corresponding to the read exporting file via the processing module activated by the system for inquiring product exportation;

(3-2) transmitting the quotation and the exportation data report via the system for inquiring product exportation to the browser of the terminal device through the network communication system, so as to allow the user to examine exported products;

(3—3) transmitting the quotation and the exportation data report via the user at the terminal device to a client who orders the exported products; and (3-4) examining the exported products via the client according to the exportation data report, and paying for the products according to the quotation upon receiving the quotation and the exportation data report.

11. The method of claim 8, wherein the system for inquiring product exportation comprises:

the exporting station;

the database; and a database server for receiving the identification code inputted by the user at the terminal device, and for reading an exporting file in the database having an identification code corresponding to the received identification code.

12. The method of claim 8, wherein the identification code is a client sequence number or a product category sequence number.

13. A method for inquiring product exportation, for use with a system for inquiring product exportation, for allowing a user at a terminal device to inquire associated data relating to product exportation on a browser of the terminal device via a network communication system, wherein an exporting station of the system for inquiring product exportation pre-establishes an exporting file corresponding to each product exportation, and stored the established exporting file in a database;

the method comprising the steps of:

(1) inputting a client sequence number or a product category sequence number for inquiry via the user at the terminal device through the browser of the terminal device and the network communication system;

(2) reading an exporting file having a client sequence number or a product category sequence number in the database corresponding to the client sequence number or the product category sequence number inputted by the user after receiving the client sequence number or the product category sequence number transmitted from the terminal device via the system for inquiring product exportation;

(3) establishing a quotation and an exportation data report corresponding to the exporting file via the system for inquiring product exportation;

(4) transmitting the quotation and the exportation data report via the system for inquiring product exportation to the browser of the terminal device, so as to allow the user to examine exported products; and (5) transmitting the quotation and the exportation data report via the user at the terminal device to a client who orders the exported products, so as to allow the client to examine the exported products.

14. The method of claim 13, wherein the step (2) further comprises the steps of:

(2-1) determining via the system for inquiring product exportation if an exporting file has a client sequence number or a product category sequence number in the database exactly matching the client sequence number or the product category sequence number inputted by the user, wherein if the exactly matching exporting file is available, then the step (3) is followed;

or else, step (2—2) is followed;

(2—2) comparing via the system for inquiring product exportation the client sequence number or the product category sequence number inputted by the user with client sequence numbers or product category sequence numbers of exporting tiles in the database, and determining if an exporting file in the database has a client sequence number or a product category sequence number similarly matching the client sequence number or the product category sequence number inputted by the user, wherein if the similarly matching exporting file is available, then the step (3) is followed;

or else, step (2-3) is followed; and (2-3) informing the user at the terminal device of failure in searching an exactly matching or similarly matching exporting file via the system for inquiring product exportation.

15. The method of claim 14, wherein in the step (2—2), the client sequence number or the product category sequence number inputted by the user is compared in a first few numerals with the client sequence numbers or the product category sequence numbers of the exporting files in the database.

* * * * *